(12) United States Patent  
Bender

(10) Patent No.: US 6,491,524 B2
(45) Date of Patent: Dec. 10, 2002

(54) READING DEVICE AND METHODS OF USING SAME TO TEACH AND LEARN READING

(75) Inventor: Patricia Bender, P.O. Box 1668, Picayune, MS (US) 39466

(73) Assignee: Patricia Bender, Picayune, MS (US)

( * ) Notice: Subject to any disclaimer, the term of this patent is extended or adjusted under 35 U.S.C. 154(b) by 0 days.

(21) Appl. No.: 09/825,062

(22) Filed: Apr. 4, 2001

(65) Prior Publication Data

US 2002/0146669 A1 Oct. 10, 2002

(51) Int. Cl.[7] .................................................. G09B 1/00
(52) U.S. Cl. ........................ 434/159; 434/160; 434/175
(58) Field of Search .............................. 434/159, 160, 434/167, 171, 176, 178, 405, 404

(56) References Cited

U.S. PATENT DOCUMENTS

| | | | | |
|---|---|---|---|---|
| 3,172,214 A | * | 3/1965 | Aberge | 434/167 |
| 3,982,332 A | * | 9/1976 | Szymczak | 40/352 |
| 4,007,548 A | * | 2/1977 | Cytanovich | 434/178 |
| 4,193,212 A | * | 3/1980 | Al-Kufaishi | 434/178 |
| 5,108,113 A | * | 4/1992 | Leach | 273/302 |
| 5,306,153 A | * | 4/1994 | Foster | 434/167 |
| 5,336,093 A | | 8/1994 | Cox | |
| 5,788,503 A | * | 8/1998 | Shapiro et al. | 434/157 |
| 5,906,492 A | * | 5/1999 | Putterman | 273/299 |
| 5,951,298 A | * | 9/1999 | Werzberger | 281/15.1 |
| 6,068,487 A | | 5/2000 | Dionne | |
| 6,077,080 A | * | 6/2000 | Rai | 434/159 |

* cited by examiner

Primary Examiner—Kien T. Nguyen
(74) Attorney, Agent, or Firm—Patton Boggs LLP

(57) ABSTRACT

A reading device for teaching or learning reading is composed of: (A) a two-layer structure containing a first layer, an opposite second layer, viewing slots formed in corresponding portions of the first and second layers, and a hollow pocket defined between the first and second layers; wherein: the first layer has printed on a front face thereof a letter/image chart, and the second layer has printed on a back face thereof a numerical listing of the names of the objects represented by the images on the letter/image chart; and (B) a flat card having a front face which is blank and a back face which preferably has printed thereon one or more sample words or sentences. The flat card is disposed for insertion into the hollow pocket defined between the first and second layers. Methods for teaching or learning reading using the reading device involves obtaining the reading device; obtaining reading material; and, for each unfamiliar word in the reading material: locating the first letter or single-sound letter combination of the word on the letter/image chart; pronouncing the name of the image proximate to the letter so as to sound out the letter or letter combination; and repeating these two steps for each successive letter or single-sound letter combination in the word so as to pronounce the entire word.

19 Claims, 4 Drawing Sheets

Fig. 1B

| 54 | 55 | 56 | 57 | 58 | 59 | 60 | 61 | 62 | 63 |
|---|---|---|---|---|---|---|---|---|---|
| er | or | air | ar | or | aw | ou | oi | oy | ea |
| | | | | | | | | | 63 ē eat<br>ĕ head<br>ā break |
| 64 | 65 | 66 | 67 | 68 | 69 | 70 | 71 | 72 | 73 |
| oa | ū<br>ue | au | 67 ē field<br>ī pie<br>y lilies<br>ar | ā<br>or | ō<br>aw | o͞o<br>o͝o<br>ew | o͞o<br>oi | ū<br>ā<br>oy | 73 ā they<br>ē key<br>ē valley<br>ey |
| 74 | 75 | 76 | 77 | 78 | 79 | 80 | 81 | 82 | 83 |
| 74 ē conceit<br>ā vein<br>i forfeit<br>ei | 75 ĕd graded<br>d loved<br>t wrecked<br>ed | ī<br>igh | ā<br>eigh | ā<br>ai | si<br>ti<br>ci | k<br>ck | g<br>gh | ā<br>ay | kn<br>ph<br>n f |
| 84 | 85 | 86 | 87 | 88 | 89 | 90 | 91 | 92 | 93 |
| wr | n<br>gn | spr | spl | j<br>dge | i | sch | ng | zh<br>si | 93 ow round<br>o four<br>o͞o you<br>ŭ country<br>ou |
| 94 | 95 | 96 | 97 | 98 | 99 | 100 | | | |
| sk | st | sm | nt | st | 99 ō though<br>o͞o through<br>uf rough<br>off cough<br>ow thou<br>ow bough | 100 as<br>has<br>z | | | |

1. apple (ă)
2. asleep (a)
3. ape (ā)
4. baby
5. cat (k)
6. cent (s)
7. dog
8. eagle (ē)
9. egg (ĕ)
10. fish
11. gem
12. girl
13. house
14. igloo (ĭ)
15. ice water (ī)
16. jump
17. kite
18. leg
19. mouse
20. nest
21. octopus (ŏ)
22. rose
23. moon
24. pig
25. quarter (kw)
26. rabbit
27. sock
28. music (z)
29. turtle
30. book (u̇)
31. flute (ū)
32. umbrella (ŭ)
33. vase
34. wagon
35. box (ks)
36. baby (ī)
37. yard
38. my (ī)
39. zipper
40. chair
41. ship
42. three
43. wheel
44. snake (ā)
45. tree (ē)
46. tiger (ī)
47. rose (ō)
48. flute (ū)
49. owl (au)
50. bow (ō)
51. turtle (ur)
52. earth (ear)
53. bird (ir)
54. butter (er)
55. work (or)
56. airplane (ar)
57. jar (a)
58. horse (o)
59. straw (aw)
60. mouse (ou)
61. oil (oi)
62. boy (oy)
63. eat (ē), head (ĕ), break (ā)
64. boat (ō)
65. Sue (ū)
66. automobile (ō)
67. field (ē), pie (ī), lilies (ĭ)
68. rain (ā)
69. toe (ō)
70. grew (o͞o), new (ū)
71. fruit (o͞o), suit (ū)
72. pay (ā)
73. they (ā), key (ē), valley (ē)
74. conceit (ē), vein (ā), forfeit (ĭ)
75. graded (ĕd), loved (d), wrecked (t)
76. light (i)
77. 8 (ā)
78. bridge (j)
79. ship (si), (ti), (ci)
80. check (k)
81. ghost (g)
82. knee (n)
83. phone (f)
84. write (r)
85. gnat (n)
86. sprout (cluster)
87. split (cluster)
88. straw (cluster)
89. screwdriver (cluster)
90. school (sk)
91. rang (ng)
92. vision chart (zh)
93. round (ow), four (ō), you (o͞o), country (ŭ)
94. skate (blend)
95. stamp (blend)
96. smoke (blend)
97. tent (blend)
98. nest (blend)
99. though (oh), through (oo), rough (uf), cough (off), thou (ow), bough (ow)
100. has, as (z)

4B → Hē h(ur)t his (kn)ēē.

4C → L(oo)k ăt mȳ căt.

4D → (Sh)ē āté (eigh)t ăp(pl)és.

4E → Ī hāté (th)ăt ō(ld) rĕd hăt.

READING DEVICE AND METHODS OF USING SAME TO TEACH AND LEARN READING

BACKGROUND OF THE INVENTION

The present invention relates to reading devices. More particularly, this invention relates to a reading device for use in teaching or learning reading. In addition, the present invention relates to methods of learning and teaching reading using the reading device of this invention.

Methods and devices for teaching or learning how to read are known in the art. Reference is made, e.g., to U.S. Pat. Nos. 4,007,548; 3,172,214; 4,193,212; 5,336,093; 6,068,487; 3,982,332; and 6,077,080.

U.S. Pat. No. 4,007,548 to Cytanovich discloses a method of teaching reading by means of an orthography that includes the words written in standard type and pictorial symbols representing the sounds of vowel phonemes and consonant digraphs appearing in the material proximately located to the phonemes and digraphs to assist in pronouncing the sounds. The patent teaches that the words are written in any standard type font at one location on a paper and in the orthography of the invention in a visually separable location on the paper. A disadvantage to the method taught in Cytanovich is that it does not use a standard chart of letters and images which can be used regardless of the particular words to be read. Instead, Cytanovich uses pictorial symbols in each word, the symbols being selected for the specific word. The use of pictorial symbols above or below each word throughout the reading material can be cumbersome and can make the reading material difficult to read.

U.S. Pat. No. 3,172,214 to Aberge et al. discloses an educational device for teaching reading using question-answer matching. The device has a frame with question-viewing windows, and question and answer slides insertable in the frame for display through the windows. The device is described as useful for rapid training of children of common word-image associations, the meaning of printed words by associating the printed words with visual images such as pictorial representations, and the association of visual images and words by permitting the child to repeatedly view, handle and compare the images and associated words. A disadvantage of the Aberge et al device is that it is limited to teaching reading via word-image associations. It is more desirable to teach reading via letter-image associations.

U.S. Pat. No. 4,193,212 to Al-Kufaishi discloses a set of diacritics, which when applied in the English alphabet in conjunction with the existing or traditional system of diacritical markings, provides through the single combined set, the ability to couple correct pronunciation of words with the correct spelling thereof. A disadvantage of the Al-Kufaishi method is that it does not use pictorial images to assist in learning pronunciation of letters. Pictorial images are helpful to learning the sound of a particular letter, particularly vowel phonemes and consonant digraphs.

U.S. Pat. No. 5,336,093 to Cox discloses a method for instructing and aiding disabled readers by dividing multi-syllabic words in a passage into their single syllable components and placing a dot above the vowel, vowel diphthong, or vowel digraph which contributes to the distinctive sound of that syllable. As with the method disclosed in Al-Kufaishi, the Cox method is disadvantageous in its failure to use pictorial images in assisting the letting of letter sounds.

U.S. Pat. No. 6,068,487 to Dionne discloses a method for having a reading machine spell a word which includes retrieving a word to be spelled, displaying the first character of the word on a display while applying a highlighting indicia to the character, synthesizing speech for the character to have the reading machine pronounce the displayed letter of the word, unhighlighting the displayed letter of the word, and retrieving a subsequent letter of the word. A drawback of the Dionne method is that it requires the use of a reading machine to learn pronunciation of letters, rather than a more simple device.

U.S. Pat. No. 5,993,218 to Kapell discloses a word kit for use in creating poetry and as a teaching aid for teaching speech concepts, the word kit being composed of an assemblage of objects, each object presenting a plurality of surfaces. The assemblage includes a first set of objects having a first surface of the plurality of surfaces. A word selected from an interchangeable part of speech is depicted on the first surface and each additional surface of the plurality surfaces depicts another word selected from the interchangeable part of speech. A second set of objects has each of the plurality of surfaces thereof depicting a noninterchangeable series of letters. A drawback to the Kapel device is that it does not teach sounds or pronunciation of individual letters of words.

U.S. Pat. No. 3,982,332 to Szymczak discloses a speed reading aid for reading down columns of characters of successive greater width or complexity. The device is a hand manipulated packet containing a series of removable opaque cards, each card having one or more characteristic slots therein suitable for viewing a line of characters of a particular overall width. The Szymczak device is not used to teach or learn basic reading but merely to read more quickly.

U.S. Pat. No. 6,077,080 to Rai discloses an education method for aiding the teaching and learning of proper English reading, sounding and spelling, wherein the method uses colors and symbols to represent vowel, consonant, and phonogram sounds and silent sounds. Rai does not teach the use of pictorial images to learn pronunciation of individual letters or consonant digraphs. The pictorial images are used in Rai in conjunction with complete words rather than letters.

Although devices for teaching and learning reading are known, it is continually desirable to provide improved devices which allow reading to be more easily learned and taught, and which are easy to use and carry.

Accordingly, a primary object of this invention is to provide a reading device which allows reading to be easily learned and taught.

A further object of this invention is to provide a reading device which uses letter-image associations to teach reading.

Another object of this invention is to provide a reading device which uses pictorial images to assist pronunciation of the sounds of individual letters and letter combinations having a single sound.

Another object of this invention is to provide a reading device for use in teaching or learning to read, wherein the device is compact and does not require expensive equipment, skilled teachers, or extensive time demands.

A further object of this invention is to provide a method for teaching reading using a reading device satisfying the preceding objects.

Another object of this invention is to provide a method for learning reading using a reading device satisfying the preceding objects.

These and other objects are achieved in the present invention.

SUMMARY OF THE INVENTION

One aspect of the present invention is directed to a reading device for teaching and learning to read. Broadly, the reading device of this invention is composed of:

(A) a two-layer structure composed of: (a) first layer, (b) an opposite second layer, (c) viewing slots formed in corresponding portions of the first and second layers, and (d) a hollow pocket defined between the first and second layers; wherein:

(1) the first layer has printed on a front face thereof a letter/image chart containing (i) all the letters of the alphabet, (ii) all or substantially all letter combinations composed of successive letters having a single sound (referred to herein as "single-sound letter combinations"); (iii) proximate to each letter and letter combination, an image of an object the name of which is indicative of the sound of the letter or letter combination; and (iv) a number proximate to each letter and single-sound letter combination on the letter/image chart; and (2) the second layer has printed on a back face thereof a numerical listing of the names of the objects represented by the images on the letter/image chart; and (B) a flat card having a front face which is blank and a back face which preferably has printed thereon one or more sample words or sentences, the flat card being disposed for insertion into the hollow pocket defined between the first and second layers. The present invention is further directed to methods of teaching and learning reading using the reading device of this invention.

The method of teaching a person to read using the reading device of this invention involves the following steps:

(1) providing the person with the reading device of this invention;

(2) providing the person with reading material; and (3) for each word in the reading material which is unfamiliar to the person, having the person: (a) locate the first letter or single-sound letter combination of the word on the letter/image chart; (b) pronounce the name of the image proximate to the letter so as to sound out the letter or letter combination; and (c) repeat steps (3)(a) and (3)(b) for each successive letter or single-sound letter combination in the word so that the person is able to pronounce the entire word.

Preferably, the method further involves, between steps (2) and (3), the additional steps of: (2)(a) having the person place the reading device onto the reading material such that the letter/image chart faces the person and the viewing slots are placed over a portion of the reading material which is to be read first; and (2)(b) having the person insert the card into the pocket defined between the first and second layers such that the blank front face of the card is seen through the viewing slots, wherein step (2)(a) is carried out either before or after step (2)(b). Preferably, step (3) further involves, prior to step (3)(a), moving the card inserted in the pocket such that the blank face of the card blocks off all parts of the portion of the reading material except for the letter or letter combination which the person wishes to pronounce.

The present invention also provides a method of learning to read using the reading device wherein the same steps recited above are performed by the person learning to read.

The presence of the numerical listing of the names of the objects represented by the images on the letter/image chart permits the user to take the further step, if needed, of locating on the numerical listing the names of any objects represented by the images on the letter/image chart which the person cannot identify.

The reading material can be any printing medium on which words or sentences are printed, e.g., books, magazines, etc.

Having the letter-image chart face the reader saves the reader time and effort in locating the image and, therefore, learning the sound of the letter. In other words, having the letter-image chart printed on the side of the device facing the reader saves the reader time and effort in learning to read.

A further advantage provided by the present invention is that the blank side of the card can be inserted into the pocket of the device so as to cover all parts of the reading material except a particular letter or word. This feature allows the reader to focus on the reading material one letter or word at a time.

The methods of this invention may further involve the use of an auditory listening medium, such as a tape, cassette, CD rom, or the like, for confirming pronunciation of the letters or words in the sample words or sentences.

The reading device and methods of this invention are designed to teach and learn reading rapidly with minimal instruction and supervision.

Because the letter/image chart used in the reading device of this invention sets forth all the letters of the alphabet and all or substantially all letter combinations having a single sound, the contents of the letter/image chart will not have to be varied in accordance with the particular word or words to be read. In other words, a single chart can be used for any word or words to be learned. As noted previously, the Cytanovich reading method uses an orthography wherein pictorial symbols are used in the reading material itself; thus, the "chart" of pictorial symbols will vary in accordance with the particular word or words to be read.

Another advantage of the present invention is that the pictorial images used therein are located on a chart rather than in the reading material itself. As mentioned previously herein in connection with the Cytanovich patent, the use of pictorial symbols within the reading material can render the material difficult to read. In the present invention, use of diacritical-type markings rather than pictorial symbols in the reading material renders the material much easier to read.

Another advantage of the reading device of this invention is its compactness of structure and, therefore, portability.

Use of the reading device of this invention to teach or learn reading does not require expensive equipment, skilled teachers, or extensive time demands. Thus, the reading device of this invention allows reading to be easily learned and easily taught.

The reading device of this invention also permits the reader to comprehend the progress he or she is making toward learning to read while enjoying it.

BRIEF DESCRIPTION OF THE DRAWINGS

FIGS. 1A and 1B illustrate a top and a bottom portion, respectively, of a front view of the two-layer reading device of this invention, wherein the front face of the first layer of the device has printed thereon the letter/image chart used in the invention.

FIG. 2 illustrates a back view of the two-layer reading device of this invention, wherein the back face of the second layer of the device has printed thereon a numerical list of the names of the objects represented in the images set forth in the image/letter chart shown in FIGS. 1A and 1B.

FIG. 3 illustrates a back view of a flat card which can be inserted in a hollow pocket formed between the layers of the reading device of this invention, wherein printed on the back face of the card are sample sentences written in the orthography used in the present invention.

DETAILED DESCRIPTION OF THE INVENTION

Figure 1A:
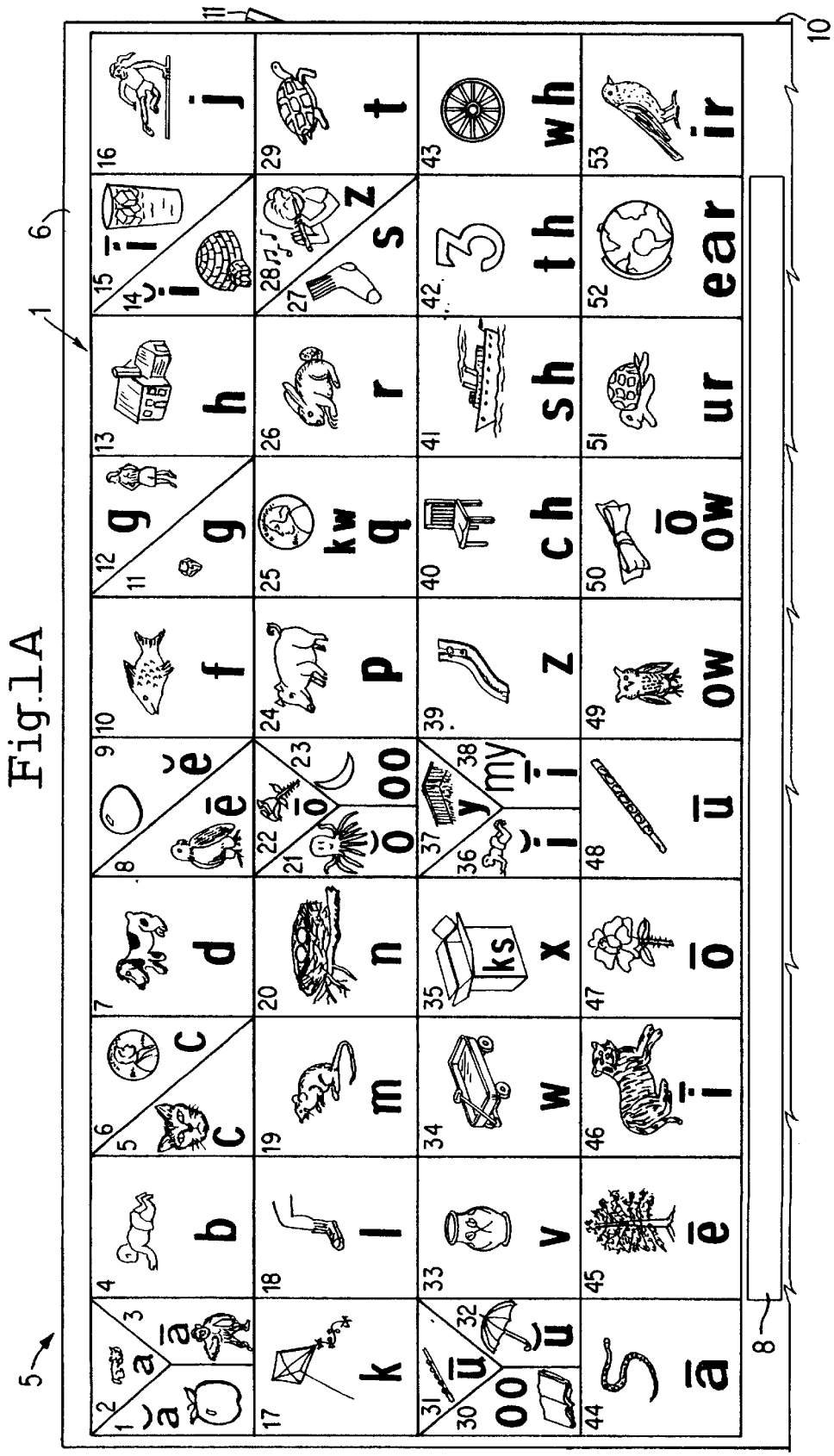

As stated hereinabove, the present invention is directed to a reading device for teaching and learning reading and to methods for teaching and learning reading using the device. The reading device and methods of this invention will be described with reference to FIGS. 1A–3.

The reading device of this invention can be adapted for use in reading any language. For purposes of simplicity, however, the reading device described herein is one which is adapted for use in reading the English language. Broadly, the reading device of this invention contains:

(A) a two-layer structure composed of: (a) first layer, (b) an opposite second layer, (c) viewing slots formed in corresponding portions of the first and second layers, and (d) a hollow pocket defined between the first and second layers; wherein:

(1) the first layer has printed on a front face thereof a letter/image chart containing (i) all the letters of the alphabet, (ii) all or substantially all letter combinations composed of successive letters having a single sound (referred to herein as "single-sound letter combinations"); (iii) proximate to each letter and letter combination, an image of an object the name of which is indicative of the sound of the letter or letter combination; and (iv) a number proximate to each letter and single-sound letter combination on the letter/image chart; and (2) the second layer has printed on a back face thereof a numerical listing of the names of the objects represented by the images on the letter/image chart; and (B) a flat card having a front face which is blank and a back face which preferably has printed thereon one or more sample words or sentences, wherein the flat card is disposed for insertion into the hollow pocket defined between the first and second layers.

In the reading device of this invention, the letter/image chart displays all of the letters of the alphabet and all or substantially all letter combinations composed of successive letters having a single sound ("single-sound letter combinations"). Examples of single-sound letter combinations in the English language include digraphs such as "sh", "ch", "wh" and the like, as well as letter combinations such as "ear" (as in the word "earth"), and "spl" (as in the word "split").

Proximate to each letter and letter combination, the chart sets forth an image of an object the name of which is indicative of the sound of the letter or letter combination. Any appropriate image may be used to indicate the sounds of the letters or letter combinations. Generally, the images used should be those which have meaning to the reader. Thus, as known to one of ordinary skill in the teaching arts to which this invention relates, the images used should be selected to be quickly recognized, and without distracting connations, based on the reader's age, background and culture. In addition, the word represented by the image should be easy to pronunciate.

FIGS. 1A and 1B illustrate, respectively, a top portion and a bottom portion of an example of a letter/image chart 1 which can be used in the present invention.

As shown in FIGS. 1A and 1B, the letter/image chart will preferably provide an image not only for each letter of the alphabet but also for different vowel sounds and different consonant sounds.

In the example shown in FIGS. 1A and 1B, for the vowel "a", the image of an apple is provided to represent the short vowel sound, the image of someone asleep is used to represent the soft vowel sound, and the images of an ape and a snake are used to designate the long vowel sound. For the vowel "e", images of an eagle and a tree are used to represent its long vowel sound, and the image of an egg is used to represent the short vowel sound. For the vowel "i", the image of an igloo represents the short vowel sound, and the images of ice and a tiger represent the long vowel sound. For the vowel "o", the image of an octopus represents the short vowel sound, the images of a rose and a bow represent the long vowel sound, and the image of the moon represents the "double o" sound of the letter. For the vowel "u", the image of a book is used to represent its double-o sound, the image of a flute is used to represent the long vowel sound, and the image of an umbrella is used to illustrate the short vowel sound. For the letter "y", the image of a baby is used to represent the long "e" sound of the letter, the image of a yard is used to represent the "y" sound the letter, and the word "my" is used to represent the long "i" sound of the letter.

In addition, the letter/image chart will provide images for different sounds of a single consonant. For example, for the consonant "c", the image of a cat is used to represent the "k" sound and the image of a cent is used to represent the "s" sound. To represent the two sounds of the consonant "g", images of a gem and a girl are used. For the letter "s", the image of a sock is used to represent the "s" sound of the letter, and an image representing music is used to represent the "z" sound of the letter.

The letter/image chart also provides images for consonants having a single sound, e.g., "b" "d", "f", "h", "j", "k", "l", "m", "n", "p", "r", "t", "v", "w", "x", and "z". Thus, for example, the image of baby represents the sound of the letter "b", the image of a dog represents the sound of the letter "d", the image of a fish represents the sound of the letter "f", and so on.

For the letter "q", the letter combination "kw" and the image of a quarter is used to illustrate the sound of the letter.

As stated previously herein, the letter/image chart also provides images for single-sound letter combinations. For example, the image of a turtle is used to represent the sound of the letter combination "ur". The image of a rose and of an owl are used to illustrate the two sounds of the letter combination "ow". The sound of the letter combination "ear" is represented by an image of the planet Earth. The image of a bird is used to illustrate the sound of the "ir" letter combination; and so on.

In the letter/image chart, the letters and letter combinations will be numbered. This, in conjunction with the numerical list of the names of the objects represented by the images on the letter/image chart, will help (if necessary) the reader to identify the objects represented by the images on the letter/image chart. A preferred example of such a list is set forth in FIG. 2 under reference numeral 2.

As stated above, the reading device of this invention preferably further includes a flat card, the front face of which is left blank and the back face of which has printed thereon one or more sample sentences.

Insertion of the flat card into the pocket defined between the two layers of the reading device such that the blank face of the card is shown through the viewing slots formed in the reading device allows the reader to block off all portions of the reading material except for the letter or word on which the reader wishes to focus. For example, during the reading exercise, the reader may use the blank side of the card to block off all parts of the reading material so as to focus on the material one letter or two letters at a time.

Use of the sample sentences written on the back face of the card allows the reader to practice reading using the symbols used in the letter-image chart. When written in English, the one or more sentences are preferably set forth in an orthography composed of: (a) letters in standard type (e.g., normal font); (b) markings proximate to each vowel to designate whether the vowel has a short, long or soft sound; (c) markings to designate letter combinations which have a single sound; and (d) markings to designate letters or letter combinations which are silent.

FIG. 3 illustrates an example of the back face 3 of a flat card 4 which can be used in the present invention, on which are printed five sentences 4A–4E written in the orthography preferably used in the present invention.

In sentences 4A–4E, a mark is placed above each vowel indicating whether the vowel sound is long, short or soft. A horizontal dash (i.e., a macron) represents a long vowel sound, a u-shaped mark (i.e., a breve) indicates a short vowel sound, and a schwa indicates a soft vowel sound. Although the sentences set forth in FIG. 3 use macron, breve and schwa marks to indicate particular vowel sounds, other suitable marks can be used.

In sentences 4A–4E, parentheses are preferably used to designate letter combinations having a single sound, e.g., (th) in the word "the", (ur) in the word "hurt", (eigh) in the word "eight", (sh) in the word "she", (th) in the word "that", (ld) in the word "old", and (h) in the word "telephone". For letter combinations having a sound like that of a letter not in the combination, a slash (/) mark can be placed through the combination and the letter which the combination sounds like placed above the slashed combination. For example, in the word "telephone", the letter combination "ph" sounds like the letter "f". Thus, in the orthography illustrated in FIG. 3, the sound of the "ph" combination in the word "telephone" is indicated by placing parentheses around the combination to indicate a single sound, a slash mark through the combination to indicate a different letter sound, and the letter "f" above the letter combination to indicate the particular letter sound.

For a single letter sounding like a different letter in a particular word, e.g., the "y" in the word "my", the letter can be marked with a slash (/) and the letter "i" marked to indicate the long vowel sound placed above the slashed mark.

For consonants having a single sound, i.e., "b", "d", "f", "h", "j", "k", "l", "m", "n", "p", "r", "t", "v", "w", "x", and "z", no mark is deemed necessary to assist pronunciation.

In the orthography set forth in sentences 4A–4E, letters having no sound in a particular word, e.g., the letter "e" in such words as "use", "ate", "hate" and "apple", are marked out with the omission mark "x".

The preferred structure of the reading device of this invention is illustrated in FIGS. 1A, 1B and 2. In this embodiment, the device is composed of:

(a) a two-layer structure 5 having a first layer 6 (FIGS. 1A and 1B) an opposite second layer 7 (FIG. 2), viewing slots 8 and 8' (FIGS. 1 and 2) formed in corresponding aligned central portions of the first and second layers, the first and second layers defining a hollow pocket 9 (FIGS. 1A and 1B) therebetween; wherein the letter/image chart 1 is printed on the front face of first layer 6 (FIGS. 1A and 1B) and numerical listing 2 is printed on the back face of second layer 7 (FIG. 2); and (b) a flat card 4 (FIG. 3) having a front face (not shown) which is left blank and a back face 3 on which are printed sample sentences 4A–4E (FIG. 3), the card being disposed to fit within hollow pocket 9 via open side edge 10 of two-layer structure 5.

Preferably card 4 is attached to structure 5. Card 4 can be attached to structure 5 via any suitable means. For example, in FIGS. 1A and 1B, card 4 (not shown) is attached to structure 5 via two ribbons 11 extending from open side edge 10 of the structure.

Preferably card 4 is attached to structure 5. Card 4 can be attached to structure 5 via any suitable means. For example, in FIG. 1, card 4 (not shown) is attached to structure 5 via two ribbons 11 extending from open side edge 10 of the structure.

The reading device of this invention can be composed of any suitable material, e.g., wood or plastic, preferably plastic.

Broadly, the method of teaching a person to read using the reading device of this invention involves the following steps:

(1) providing the person with the reading device of this invention;

(2) providing the person with reading material; and (3) for each word in the reading material which is unfamiliar to the person, having the person: (a) locate the first letter or single-sound letter combination of the word on the letter/image chart; (b) pronounce the name of the image proximate to the letter so as to sound out the letter or letter combination; and (c) repeat steps (3)(a) and (3)(b) for each successive letter or single-sound letter combination in the word so that the person is able to pronounce the entire word.

Preferably, the above method further involves, between steps (2) and (3), the additional steps of: (2)(a) having the person place the reading device onto the reading material such that the letter/image chart faces the person and the viewing slots are placed over a portion of the reading material which is to be read first; and (2)(b) having the person insert the card into the pocket defined between the first and second layers such that the blank front face of the card is seen through the viewing slots, wherein step (2)(a) is carried out either before or after step (2)(b). Step (3) preferably involves before step (3)(a), the step of moving the card inserted in the pocket such that the blank face of the card blocks off all parts of the portion of the reading material except for the letter or letter combination which the person wishes to pronounce.

Step (3) may further involve, between steps (3)(a) and (3)(b), having the person locate on the numerical listing the names of any objects represented by the images on the letter/image chart which the person cannot identify.

The method of learning to read using the reading device of this invention involves the same steps as used in the method of teaching a person to read.

Operation of the embodiment of the reading device of this invention as shown in FIGS. 1A–3 and in accordance with the methods of this invention is preferably as follows. The device is placed over the reading material such that letter/image chart 1 faces the reader and viewing slots 8 and 8' are placed over a portion of the reading material to be read. Card 4 is inserted into pocket 9 defined between the two layers of the device such that the blank face of the card can be seen through the viewing slots. The reader begins to read and, when he or she encounters an unfamiliar word, the reader may place the blank face of the card so as to block off all parts of the word except the first letter or letter combination. The reader will scan letter/image chart 1 for the letter (or letter combination) and the visual image associated with that letter (or letter combination). The reader may then sound out the letter or letter combination. If the reader cannot identify an image the name of which is indicative of the sound of a particular letter (or letter combination), the reader locates on numerical listing 2 on the back face of second layer 7 the number accompanying the image on chart 1. Next to the number in listing 2 will be the name of the object represented by the corresponding image on chart 1. The reader would repeat this process for each subsequent letter or letter combination in the word.

The methods of this invention may further involve the use of an auditory listening medium, such as an audiotape, audiocassette, a CD-rom, and the like, for confirming correct pronunciation of one or more letters or words in the one or more words to be read.

As to the manner of construction of the reading device of this invention, all parts thereof can be formed of any suitable material, preferably plastic.

What is claimed is:

1. A reading device for teaching or learning reading, comprising:
    a two-layer structure including a first layer, an opposite second layer, viewing slots formed in corresponding portions of the first and second layers, and a hollow pocket defined between the first and second layers, wherein
        the first layer has printed on a front face thereof a letter/image chart containing all the letters of the alphabet, a plurality of single-sound letter combinations, proximate to each letter and single-sound letter combination an image of an object the name of which is indicative of the sound of the letter or single-sound letter combination, and a number proximate to each letter and single-sound combination on the letter/image chart, and wherein
        the second layer has printed on a back face thereof a numerical listing of the names of the objects represented by the images on the letter/image chart; and
    a flat card having a front face which is blank and a back face which has printed thereon one or more sample words or sentences, the flat card being disposed for insertion into the hollow pocket defined between the first and second layers.

2. A reading device according to claim 1, wherein the letter/image chart is adapted for use in reading the English language.

3. A reading device according to claim 1, wherein the sample words or sentences are written in an orthography comprising: (a) letters written in plain text; (b) markings proximate to each vowel to designate whether the vowel has a short, long or soft sound; (c) markings to designate letter combinations which have a single sound; and (d) markings to designate letters or letter combinations which are silent; further wherein the letter/image chart comprises: (a) vowels accompanied by markings to designate whether the vowel has a short, long or soft sound; the markings accompanying the vowels on the letter/image chart being consistent with the markings used in the orthography of the one or more words to indicate whether the vowels in the one or more words have a short, long or soft sound; (b) proximate to each of the marked vowels, an image of an object the name of which is indicative of the sound of the marked vowel to which the image is proximate; (c) single-sound letter combinations; and (d) proximate to each of said single-sound letter combinations, an image of an object the name of which is indicative of the sound of the letter combination.

4. A method for teaching a person to read, comprising:
    (1) providing the person with a reading device comprising:
        a two-layer structure including a first layer, an opposite second layer, viewing slots formed in corresponding portions of the first and second layers, and a hollow pocket defined between the first and second layers, wherein
            the first layer has printed on a front face thereof a letter/image chart containing all the letters of the alphabet, a plurality of single-sound letter combinations, proximate to each letter and single-sound letter combination an image of an object the name of which is indicative of the sound of the letter or single-sound letter combination, and a number proximate to each letter and single-sound combination on the letter/image chart, and wherein
            the second layer has printed on a back face thereof a numerical listing of the names of the objects represented by the images on the letter/image chart; and
        a flat card having a front face which is blank and a back face which has printed thereon one or more sample words or sentences, the flat card being disposed for insertion into the hollow pocket defined between the first and second layers;
    (2) providing the person with reading material; and
    (3) for each word in the reading material which is unfamiliar to the person, having the person: (a) locate the first letter or single-sound letter combination of the word on the letter/image chart; (b) pronounce the name of the image proximate to the letter so as to sound out the letter or letter combination; and (c) repeat steps (3)(a) and (3)(b) for each successive letter or single-sound letter combination in the word so that the person is able to pronounce the entire word.

5. A method according to claim 4, further comprising, between steps (2) and (3), the additional steps of: (2)(a) having the person place the reading device onto the reading material such that the letter/image chart faces the person and the viewing slots are placed over a portion of the reading material which is to be read first; and (2)(b) having the person insert the card into the pocket defined between the first and second layers such that the blank front face of the card is seen through the viewing slots, wherein step (2)(a) is carried out either before or after step (2)(b); wherein step (3) further comprises, before step (3)(a), moving the card inserted in the pocket such that the blank face of the card blocks off all parts of the portion of the reading material except for the letter or letter combination which the person wishes to pronounce.

6. A method according to claim 4, wherein step (3) further comprises, between steps (3)(a) and (3)(b), having the person locate on the numerical listing the names of any objects represented by the images on the letter/image chart which the person cannot identify.

7. A method according to claim 4, further comprising the step (4) of having the person read the one or more sample words or sentences, wherein step (4) is performed before step (1) or after step (3).

8. A method according to claim 7, wherein step (4) involves the sub-step of having the person insert the card into the pocket defined between the first and second layers such that all or a portion of the one or more sample words or sentences is viewed through the viewing slots.

9. A method according to claim 7, wherein the one or more sample words or sentences are in English.

10. A method according to claim 9, wherein the one or more sample words or sentences are written in an orthography comprising: (a) letters written in plain text; (b) markings proximate to each vowel to designate whether the vowel has a short, long or soft sound; (c) markings to designate letter combinations which have a single sound; and (d) markings to designate letters or letter combinations which are silent; further wherein the letter/image chart comprises: (a) vowels accompanied by markings to designate whether the vowel has a short, long or soft sound; the markings accompanying the vowels on the letter/image chart being consistent with the markings used in the orthography of the one or more words to indicate whether the vowels in the one or more words have a short, long or soft sound; (b) proximate to each of the marked vowels, an image of an object the name of which is indicative of the sound of the marked vowel to which the image is proximate; (c) single-sound letter combinations; and (d) proximate to each of said single-sound letter combinations, an image of an object the name of which is indicative of the sound of the letter combination.

11. A method according to claim 7, further comprising the step of having the person confirm pronunciation of at least one letter and/or at least one word in the one or more sample words or sentences by playing an auditory listening medium which will correctly pronounce the at least one letter and/or at least one word.

12. A method for learning to read, comprising:

(1) obtaining a reading device comprising a two-layer structure including:
   a first layer, an opposite second layer, viewing slots formed in corresponding portions of the first and second layers, and a hollow pocket defined between the first and second layers, wherein
      the first layer has printed on a front face thereof a letter/image chart containing all the letters of the alphabet, a plurality of single-sound letter combinations, proximate to each letter and single-sound letter combination an image of an object the name of which is indicative of the sound of the letter or single-sound letter combination, and a number proximate to each letter and single-sound combination on the letter/image chart, and wherein
      the second layer has printed on a back face thereof a numerical listing of the names of the objects represented by the images on the letter/image chart; and
   a flat card having a front face which is blank and a back face which has printed thereon one or more sample words or sentences, the flat card being disposed for insertion into the hollow pocket defined between the first and second layers;

(2) obtaining reading material; and (3) for each unfamiliar word in the reading material: (a) locating the first letter or single-sound letter combination of the word on the letter/image chart; (b) pronouncing the name of the image proximate to the letter so as to sound out the letter or letter combination; and
(c) repeating steps (3)(a) and (3)(b) for each successive letter or single-sound letter combination in the word so as to pronounce the entire word.

13. A method according to claim 12, further comprising, between steps (2) and (3), the additional steps of: (2)(a) placing the reading device onto the reading material such that the letter/image chart faces oneself and the viewing slots are placed over a portion of the reading material which is to be read first; and (2)(b) inserting the card into the pocket defined between the first and second layers such that the blank front face of the card is seen through the viewing slots, wherein step (2)(a) is carried out either before or after step (2)(b); wherein step (3) further comprises moving the card inserted in the pocket such that the blank face of the card blocks off all parts of the portion of the reading material except for the letter or letter combination which one wishes to pronounce.

14. A method according to claim 12, wherein step (3) further comprises, between steps (3)(a) and (3)(b), locating on the numerical listing the names of any objects represented by the images on the letter/image chart which one cannot identify.

15. A method according to claim 12, further comprising the step (4) reading the one or more sample words or sentences, wherein step (4) is performed before step (1) or after step (3).

16. A method according to claim 15, wherein step (4) involves the sub-step of inserting the card into the pocket defined between the first and second layers such that all or a portion of the one or more sample words or sentences is viewed through the viewing slots.

17. A method according to claim 15, wherein the one or more sample words or sentences are in English.

18. A method according to claim 17, wherein the one or more sample words or sentences are written in an orthography comprising: (a) letters written in plain text; (b) markings proximate to each vowel to designate whether the vowel has a short, long or soft sound; (c) markings to designate letter combinations which have a single sound; and (d) markings to designate letters or letter combinations which are silent; further wherein the letter/image chart comprises: (a) vowels accompanied by markings to designate whether the vowel has a short, long or soft sound; the markings accompanying the vowels on the letter/image chart being consistent with the markings used in the orthography of the one or more words to indicate whether the vowels in the one or more words have a short, long or soft sound; (b) proximate to each of the marked vowels, an image of an object the name of which is indicative of the sound of the marked vowel to which the image is proximate; (c) single-sound letter combinations; and (d) proximate to each of said single-sound letter combinations, an image of an object the name of which is indicative of the sound of the letter combination.

19. A method according to claim 15, further comprising the step of confirming pronunciation of at least one letter and/or at least one word in the one or more sample words or sentences by playing an auditory listening medium which will correctly pronounce the at least one letter and/or at least one word.

* * * * *